United States Patent
Jiang

(10) Patent No.: US 12,238,018 B2
(45) Date of Patent: Feb. 25, 2025

(54) METHOD AND DEVICE FOR TRANSMITTING INFORMATION RELATED TO MEASUREMENT

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 356 days.

(21) Appl. No.: 17/440,650

(22) PCT Filed: Mar. 21, 2019

(86) PCT No.: PCT/CN2019/079120
§ 371 (c)(1),
(2) Date: Sep. 17, 2021

(87) PCT Pub. No.: WO2020/186525
PCT Pub. Date: Sep. 24, 2020

(65) Prior Publication Data
US 2022/0158784 A1    May 19, 2022

(51) Int. Cl.
*H04L 5/00* (2006.01)
*H04W 72/542* (2023.01)
*H04W 76/19* (2018.01)

(52) U.S. Cl.
CPC .......... *H04L 5/0032* (2013.01); *H04W 72/542* (2023.01); *H04W 76/19* (2018.02)

(58) Field of Classification Search
CPC ..... H04L 5/0032; H04L 5/001; H04L 5/0057; H04W 72/542; H04W 76/19; H04W 24/10; H04W 24/02
See application file for complete search history.

(56) References Cited

U.S. PATENT DOCUMENTS

2017/0367107 A1    12/2017  Comsa
2020/0015236 A1*    1/2020  Kung ................ H04B 7/04
(Continued)

FOREIGN PATENT DOCUMENTS

| CN | 102685795 A | 9/2012 |
| CN | 108631917 A | 10/2018 |
| WO | WO2018203679 A1 | 11/2018 |

OTHER PUBLICATIONS

Nokia et al. "Architecture Framework with ATSSS Rules and UP Access Agnostic Reporting Control Protocol" SA WG2 Meeting #127, S2-183464, Apr. 20, 2018 (Apr. 20, 2018), section 6.x.3.2, (5 pages).

(Continued)

*Primary Examiner* — Jung H Park
(74) *Attorney, Agent, or Firm* — Arch & Lake LLP

(57) ABSTRACT

A method and a device for transmitting information related to measurement are provided. The method includes that a user equipment (UE) receives a measurement configuration message sent by a base station, where the measurement configuration message includes a measurement target and threshold information. Further, the UE acquires a measurement result corresponding to the measurement target, determines whether the measurement result of the measurement target corresponding to the threshold information satisfies corresponding threshold information, and determines indication information according to the determination result. Moreover, the UE sends message 1 (Msg1) or message 3 (Msg3) to the base station, where the Msg1 or the Msg3 includes the indication information.

12 Claims, 15 Drawing Sheets

(56) References Cited

U.S. PATENT DOCUMENTS

2020/0146054 A1* 5/2020 Jeon .................. H04L 5/0053
2022/0182859 A1* 6/2022 Da Silva ........... H04W 52/0274

OTHER PUBLICATIONS

Huawei et al. "Down-selection of IDLE Mode Measurement Report Alternatives for Fast SCell Set-up" 3GPP TSG-RAN WG2 Meeting #99, R2-1708547, Aug. 25, 2017 (Aug. 25, 2017), section 2, (5 pages).

Nokia et al. "Aspects for Supporting Low Power UE" 3GPP TSG RAN WGI Meeting #87, R1-1611312, Nov. 18, 2016 (Nov. 18, 2016), entire document, (3 pages).

International Search Report in the international application No. PCT/CN2019/079120, mailed on Dec. 19, 2019, (3 pages).

English translation of the Written Opinion of the International Search Authority in the international application No. PCT/CN2019/079120, mailed on Dec. 19, 2019, (4 pages).

First Office Action of the Chinese application No. 201980000534.5, issued on Nov. 22, 2021, (12 pages).

International Search Report of PCT Application No. PCT/CN2019/079120 dated Dec. 19, 2019 with English translation, (6p).

Nokia et al., "Architecture Framework with ATSSS Rules and UP Access Agnostic Reporting Control Protocol", SA WG2 Meeting #127, S2-183464, Apr. 20, 2018, (5p).

Huawei et al., "Down-Selection of IDLE Mode Measurement Report Alternatives for Fast SCell Set-up", 3GPP TSG-RAN WG2 Meeting #99, R2-1708547, Aug. 25, 2017, (5p).

Nokia et al., "Aspects for Supporting Low Power UE", 3GPP TSG RAN WG1 Meeting #87, R1-1611312, Nov. 18, 2016, (3p).

Mediatek Inc, "Early measurement reporting from Idle/Inactive to Connected", GPP TSG-RAN WG2 Meeting #105 R2-1900437, Athens, Greece, Feb. 25-Mar. 1, 2019,(5p).

ETSI MCC, "Report of 3GPP TSG RAN2#105 meeting, Athens, Greece", 3GPP TSG-RAN WG2 meeting #105 R2-1903001, Athens, Greece Feb. 25-Mar. 1, 2019, (293p).

CNOA of application No. 201980000534.5, date on Jun. 14, 2022, with English translation, (18p).

* cited by examiner

METHOD AND DEVICE FOR TRANSMITTING INFORMATION RELATED TO MEASUREMENT

CROSS-REFERENCE TO RELATED APPLICATION

This application is the U.S. national phase application of International Application No. PCT/CN2019/079120, filed on Mar. 21, 2019, the entire contents of which are incorporated herein by reference for all purposes.

TECHNICAL FIELD

The present disclosure relates to the field of communication technology, and more particularly, to a method and device for transmitting measurement-related information.

BACKGROUND

In related art, channel quality has been a focus of attention in the art. User equipment (UE) performs measurement on a measurement frequency in an idle state. A base station may ask the UE for a measurement result, and configure information related to dual connectivity (DC) and/or carrier aggregation (CA) (DC/CA) for the UE according to the measurement result reported by the UE. It is desired in the art that the base station may acquire the measurement result earlier and in a more timely manner while avoiding network overhead increase as much as possible.

SUMMARY

The present disclosure provides a method and device for transmitting measurement-related information. The technical solution is as follows.

According to a first aspect of the present disclosure, there is provided a method for transmitting measurement-related information. The method includes that a base station generates a measurement configuration message, where the measurement configuration message includes a measurement target and threshold information; and sends the measurement configuration message to a UE.

According to a second aspect of the present disclosure, there is provided a method for transmitting measurement-related information. The method is applied to a UE, and includes that the UE receives a measurement configuration message sent by a base station, where the measurement configuration message includes a measurement target and threshold information. Additionally, the UE acquires a measurement result corresponding to the measurement target, judges whether a measurement result for a measurement target corresponding to the threshold information meets threshold information corresponding to the measurement target corresponding to the threshold information, and determines indication information according to a result of the judgment.

Furthermore, the UE sends a message Msg1 or Msg3 to the base station, the Msg1 or the Msg3 including the indication information.

According to a third aspect of the present disclosure, there is provided a device for transmitting measurement-related information.

The device includes a processor and a memory configured to store processor executable instructions.

The processor is configured to implement: generating a measurement configuration message, where the measurement configuration message including a measurement target and threshold information; and sending the measurement configuration message to a UE.

According to a fourth aspect of the present disclosure, there is provided a device for transmitting measurement-related information.

The device includes a processor and a memory configured to store processor executable instructions.

The processor is configured to implement: receiving a measurement configuration message sent by a base station, the measurement configuration message including a measurement target and threshold information; acquiring a measurement result corresponding to the measurement target; judging whether a measurement result for a measurement target corresponding to the threshold information meets threshold information corresponding to the measurement target corresponding to the threshold information, and determining indication information according to a result of the judgment; and sending a message Msg1 or Msg3 to the base station, where the Msg1 or the Msg3 includes the indication information.

According to a fifth aspect of the present disclosure, there is provided a computer-readable storage medium having stored thereon instructions which when executed by a processor, implement the method at the base station side according to the first aspect.

According to a sixth aspect of embodiments of the present disclosure, there is provided a computer-readable storage medium having stored thereon instructions which when executed by a processor, implement the method at the UE side according to the second aspect.

It should be understood that the general description above and the detailed description below are illustrative and explanatory, and do not limit the present disclosure.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims.

In related art, a base station sends a measurement frequency to UE via Radio Resource Control (RRC) signaling or a system message. The UE performs measurement on the measurement frequency in an idle state. When accessing a network, the UE carries indication information in an RRC connection setup complete message (Msg5), informing the base station of an available measurement result. Then, the base station asks the UE for the measurement result through a UE information request message. The UE reports the measurement result through a UE information reporting message. The base station configures dual connectivity (DC) and/or carrier aggregation (CA) for the UE according to the measurement result. It is being researched in the art as how to provide a network side with a measurement result earlier.

One possible solution is that the base station configures DC/CA in a message Msg4. To do this, one way is for the base station to perform blind configuration based on an estimation of the UE, provided the base station knows that the UE is in a static state (including the idle state and an inactive state). Another way is that the UE in the idle state or the inactive state reports the measurement result periodically.

With blind configuration, a problem is that even with static UE, a channel of the UE changes with a changing external environment, and therefore there is a certain risk with blind configuration.

With periodic reporting by the UE, a problem is excessive overhead. On one hand, UE power consumption is wasted, and on the other hand, there is excessive signaling overhead. Even if measurement result reporting is multiplexed with a Radio Access Network (RAN) Notification Area Update (RNAU) message, the RNAU message has to be sent at a high frequency, otherwise the effectiveness of the measurement result will be compromised. Moreover, the two solutions are mainly applicable just to static UE.

To solve the problems, in the embodiment, UE judges whether a measurement result meets a preset threshold, and sends indication information reflecting result of the judgment to a base station along with a message Msg1 or a message Msg3. In this way, the indication information related to the measurement result may be fed back to the base station timely, and this solution is applicable to UE in various states.

Figure 1:
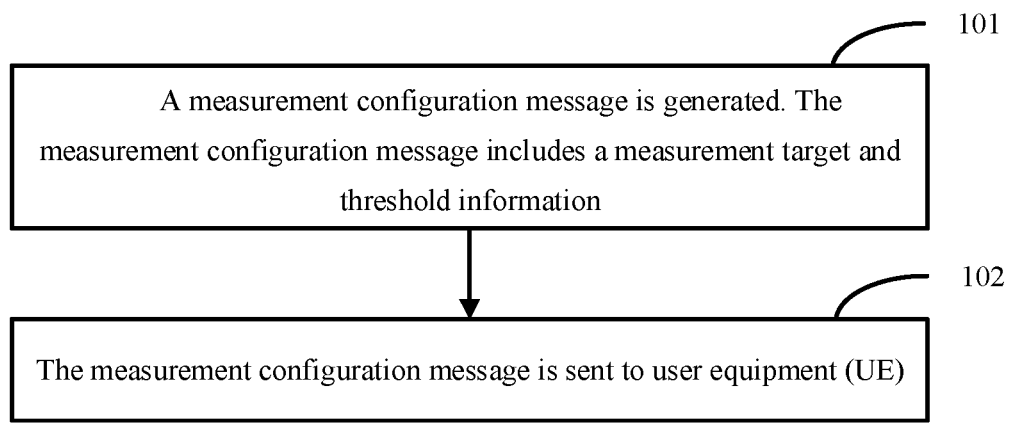
FIG. 1 is a flowchart of a method for transmitting measurement-related information according to an illustrative embodiment.

FIG. 1 is a flowchart of a method for transmitting measurement-related information according to an illustrative embodiment. The method is applied to access network equipment such as a base station. As shown in FIG. 1, the method includes steps 101-102 as follows.

In Step 101, a measurement configuration message is generated. The measurement configuration message includes a measurement target and threshold information.

In Step 102, the measurement configuration message is sent to user equipment (UE).

In the embodiment, the threshold information is added to the measurement configuration message. The base station may send the threshold information to the UE. The UE may perform judgment between a measurement result and a threshold, saving a judgment process performed by the base station between the measurement result and the threshold on one hand, and facilitating acquisition of information on the measurement result by the base station timely on the other hand.

The threshold information in the embodiment may be a specific threshold. Alternatively, the threshold information may be an identifier or index of a threshold. Various thresholds may be sent to the UE in advance, and then the identifier or the index of a threshold may be carried in the measurement configuration message.

In one embodiment, when there is a plurality of the measurement target, the threshold information includes threshold information corresponding to at least a portion of the measurement target.

In the embodiment, the measurement configuration message may carry one or more measurement targets. One or more measurement targets may correspond to one group of threshold information. Threshold information of different groups may or may not be the same. When there are multiple measurement targets, the threshold information may include threshold information corresponding to at least some of the measurement targets. That is, the number of measurement targets carried in the measurement configuration message is greater than or equal to the number of groups of threshold information carried in the measurement configuration message. The base station may perform configuration flexibly as needed.

In one embodiment, the measurement configuration message includes a Radio Resource Control (RRC) connection release message or a system message.

In the embodiment, the base station may carry the measurement target and the threshold information using a system message, which is applicable to facing a plurality of UE and is generally applicable to most UE in a cell, and may reduce the number of messages sent to UE one by one. Alternatively, the base station may carry the measurement target and the threshold information using an RRC connection release message, which is suitable for one piece of UE and facilitates personalized configuration of the UE.

In one embodiment, the threshold information includes at least one of Reference Signal Receiving Power (RSRP)

threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

The present embodiment provides multiple types of threshold information, from which the base station may make a selection and perform configuration as needed, implementing more flexible configuration, which is suitable for multiple application scenes.

In one embodiment, the method further includes a step A.

In the step A, a message Msg1 or Msg3 sent by the UE may be received. The Msg1 or the Msg3 may include indication information indicating whether a measurement result for a measurement target corresponding to the threshold information meets threshold information corresponding to the measurement target corresponding to the threshold information.

In the embodiment, the base station may acquire indication information related to a measurement result through a Msg1 or a Msg3. The Msg1 or the Msg3 may occur in many processes. Therefore, the base station may acquire the indication information timely, without having to design a message dedicated to indication information transmission, rendering fair compatibility. In addition, the base station may acquire indication information directly, reducing a determination process in relation to a measurement result by the base station side, facilitating speeding up subsequent configuration by the base station, such as DC/CA configuration. In addition, the indication information occupies less network resources compared to the measurement result.

In one embodiment, the indication information occupies 1 bit, and indicates whether the measurement result for the measurement target corresponding to the threshold information each meets the threshold information corresponding to the measurement target corresponding to the threshold information.

In the embodiment, when the value of the indication information is the first value (such as 1), it means that all measurement results of the measurement target configured with threshold information meet the respective threshold information. When the value of the indication information is the second value (such as 0), it means that not all measurement results of the measurement target configured with threshold information meet the respective threshold information. In the embodiment, the indication information occupies few bits, saving network resources.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

In the present embodiment, one measurement target configured with threshold information corresponds to one bit of indication information. When the value of the indication information of the one measurement target is a first value (such as 1), it means that each measurement result for the one measurement target meets respective threshold information. When the value of the indication information is the second value (such as 0), it means that not each measurement result for the one measurement target meets respective threshold information. Compared to the last embodiment, with the present embodiment, more bits are occupied, and the solution is more informative.

Alternatively, the number of bits occupied by the indication information equals the number of pieces of all threshold information corresponding to all measurement targets. That is, indication information corresponding to one piece of threshold information corresponding to one measurement target may occupy 1 bit. When the value of the indication information is a first value (such as 1), it means that a measurement result meets the one piece of threshold information corresponding to the measurement result. When the value of the indication information is a second value (such as 0), it means that the measurement result fails to meet the one piece of threshold information corresponding to the measurement result. With the embodiment, more detailed indication information is reported.

In one embodiment, the Msg1 or the Msg3 includes one of a random access request message, a Radio Resource Control (RRC) connection request message, an RRC connection resume request message, and an RRC connection reestablishment request message.

In the embodiment, the Msg1 or the Msg3 may be a first step in a random access process, such as a random access request message. The Msg3 may be a third step in the random access process. The Msg1 or the Msg3 may also be RRC signaling that occurs during RRC connection setup, RRC connection resume, and RRC connection re-establishment. The base station may acquire the indication information in all of the processes, in a timely fashion.

In one embodiment, when the Msg1 or the Msg3 is the random access request message, the indication information includes at least one of a preamble or a time-frequency resource for sending the preamble.

In the embodiment, when the indication information is acquired in a random access process, the preamble and/or the time-frequency resource for sending the preamble may be taken as the indication information, reducing exclusive network resource occupation by the indication information.

For example, the indication information is configured to indicate whether the measurement result for the measurement target corresponding to the threshold information each meets respective threshold information. Then, the indication information may have two values. Preambles may be divided into two groups. The first group of preambles correspond to the first value of the indication information, and the second group of preambles correspond to the second value of the indication information. When the measurement result for the measurement target corresponding to the threshold information each meets respective threshold information, a preamble is randomly selected from the first group of preambles and applied to the present random access request. When not each measurement result for the measurement target corresponding to the threshold information meets respective threshold information, a preamble is randomly selected from the second group of preambles and applied to the present random access request. The base station may determine the value of the indication information corresponding to the group including the received preamble. Similarly, time-frequency resources for sending preambles may be divided into two groups. The base station may determine the value of the indication information corresponding to the time-frequency resource bearing the received preamble.

As another example, the number of bits occupied by the indication information equals the number of measurement targets corresponding to the threshold information. One bit of indication information may be configured to indicate whether each measurement result for one measurement target corresponding to the threshold information meets threshold information corresponding to the each measurement result. For example, there are two measurement targets corresponding to two pieces of indication information, and there are a total of four values. Then, the preamble may be divided into four groups. The base station may determine the value of the indication information corresponding to the group including the received preamble.

Alternatively, time-frequency resources for transmitting preambles may be divided into four groups, and the base station may determine the value of the indication information corresponding to the time-frequency resource bearing the received preamble.

Alternatively, preambles as well as time-frequency resources for sending the preambles may be divided into two groups, respectively, with 4 combinations of the two divisions. For example, the first group of preambles may be combined with the first group of time-frequency resources, the first group of preambles may be combined with the second group of time-frequency resources, the second group of preambles may be combined with the first group of time-frequency resources, and the second group of preambles may be combined with the second group of time-frequency resources. The base station may determine the value of the indication information corresponding to the received preamble and the time-frequency resource bearing the received preamble.

Of course, a new field may be added to a random access request message for transmitting the indication information. Alternatively, the indication information may occupy an existing reserved field or a reserved value of an existing field in the random access request message.

In one embodiment, when the Msg1 or the Msg3 is the RRC connection request message, the RRC connection resume request message, or the RRC connection reestablishment request message, the indication information occupies a new field, an existing reserved field, or a reserved value of an existing field in the message.

In the embodiment, a new field may be added to RRC signaling for transmitting the indication information. Alternatively, an existing reserved field in the RRC signaling may be used for transmitting the indication information. Alternatively, a reserved value of an existing field in the RRC signaling may be taken as the value of the indication information. For example, a field may have five values, of which three being used in RRC signaling, and two being reserved values. In this case, the two reserved values may be taken as values of the indication information indicating whether each measurement result of a measurement target corresponding to the threshold information meets threshold information corresponding to the each measurement result.

In one embodiment, the method further includes a step B.

In step B, UE capability information reporting message sent by the UE may be received. The UE capability information reporting message may include UE capability information. The UE capability information may indicate whether the UE supports carrying the indication information in the Msg1 or the Msg3.

In the embodiment, the base station may learn whether the UE supports carrying the indication information in a Msg1 or a Msg3 by receiving a UE capability information reporting message. The UE may take the initiatives in reporting the UE capability information reporting message, or the base station may instruct the UE to report the UE capability information reporting message. Having learned that the UE supports reporting the indication information, the base station may configure the threshold information for the UE. If most UE covered by the base station support reporting of the indication information, the base station may configure the threshold information through a system message. If just a few UE covered by the base station support reporting of indication information, the base station may configure the threshold information through an RRC connection release message.

In one embodiment, the method further includes a step C.

In step C, a configuration message of dual connectivity (DC) and/or carrier aggregation (CA) may be sent to the UE. The configuration message may include a Radio Resource Control (RRC) connection setup message, an RRC connection resume message, or an RRC connection reestablishment message.

In the embodiment, after acquiring the indication information, the base station may configure DC and/or CA for the UE. DC/CA configuration information may be sent through an RRC connection setup message, an RRC connection resume message, or an RRC connection reestablishment message. The RRC connection setup message may be a message 4 (Msg4) in a random access process. Therefore, the base station may complete DC/CA configuration in a random access process, an RRC connection setup process, an RRC connection resume process, and an RRC connection re-establishment process.

In one embodiment, the measurement target includes at least one of a measurement frequency or a cell.

In the embodiment, the measurement target may be a measurement frequency or a cell. The base station may perform configuration flexibly as needed.

Implementation at the base station side will be elaborated below with embodiments.

Figure 2:
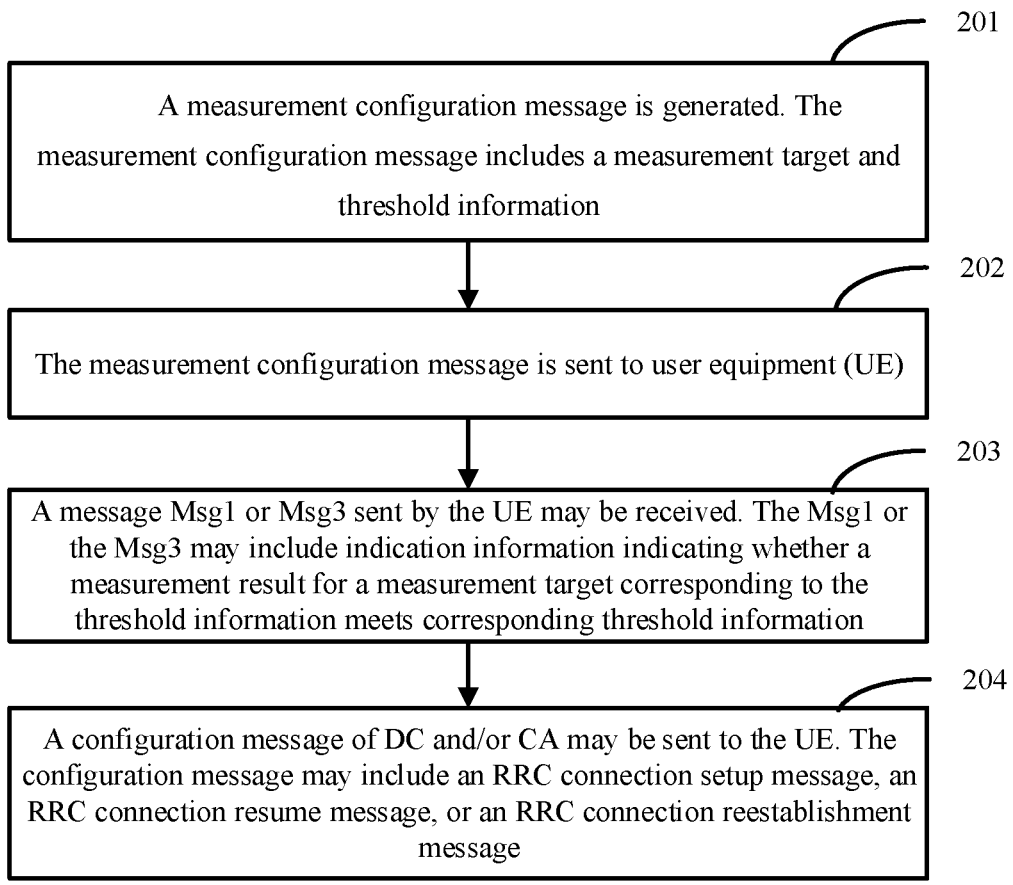
FIG. 2 is a flowchart of a method for transmitting measurement-related information according to an illustrative embodiment.

FIG. 2 is a flowchart of a method for transmitting measurement-related information according to an illustrative embodiment. The method is applied to access network equipment such as a base station. As shown in FIG. 2, the method includes steps 201-204 as follows.

In Step 201, a measurement configuration message is generated. The measurement configuration message includes a measurement target and threshold information.

In Step 202, the measurement configuration message is sent to user equipment (UE).

In Step 203, a message Msg1 or Msg3 sent by the UE may be received. The Msg1 or the Msg3 may include indication information indicating whether a measurement result for a measurement target corresponding to the threshold information meets threshold information corresponding to the measurement target corresponding to the threshold information.

In Step 204, a configuration message of dual connectivity (DC) and/or carrier aggregation (CA) may be sent to the UE. The configuration message may include a Radio Resource Control (RRC) connection setup message, an RRC connection resume message, or an RRC connection reestablishment message.

Implementation at the base station side has been introduced. Correspondingly, improvement is made at the UE side. Implementation at the UE side will be introduced below.

Figure 3:
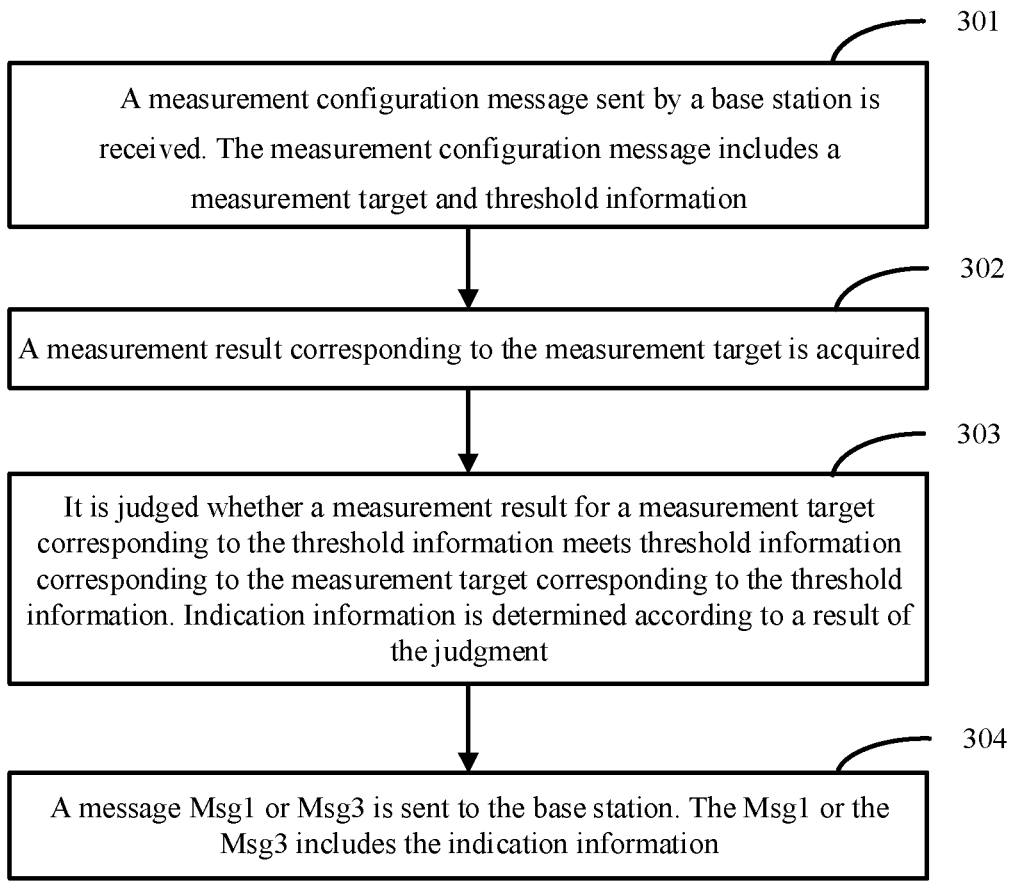
FIG. 3 is a flowchart of a method for transmitting measurement-related information according to an illustrative embodiment.

FIG. 3 is a flowchart of a method for transmitting measurement-related information according to an illustrative embodiment. The method is applied to UE. The UE may be a mobile phone, a computer, a digital broadcasting terminal, a message transceiver, a game console, tablet equipment, medical equipment, fitness equipment, a Personal Digital Assistant (PDA), etc. As shown in FIG. 3, the method includes steps 301-304 as follows.

In Step 301, a measurement configuration message sent by a base station is received. The measurement configuration message includes a measurement target and threshold information.

In Step 302, a measurement result corresponding to the measurement target is acquired.

In Step 303, it is judged whether a measurement result for a measurement target corresponding to the threshold information meets threshold information corresponding to the measurement target corresponding to the threshold information. Indication information is determined according to a result of the judgment.

In Step 304, a message Msg1 or Msg3 is sent to the base station. The Msg1 or the Msg3 includes the indication information.

In the embodiment, the UE may receive and identify the measurement configuration message carrying the threshold information, and make a judgment regarding a measurement result and the threshold information, thereby acquiring indication information. The UE may take the initiatives in reporting the indication information to the base station through a Msg1 or a Msg3, so that the base station performs subsequent configuration such as DC/CA configuration according to the indication information timely.

After acquiring the threshold information, the UE may repeat S302, that is, measurement regarding the measurement target. To send a Msg1 or a Msg3, the UE may report the indication information to the base station. The UE may always use the measurement target and the threshold information most recently configured until receiving a new measurement configuration message.

In one embodiment, when there is a plurality of the measurement target, the threshold information includes threshold information corresponding to at least a portion of the measurement target.

In the embodiment, the measurement configuration message may carry one or more measurement targets. One or more measurement targets may correspond to one group of threshold information. Threshold information of different groups may or may not be the same. When there are multiple measurement targets, the threshold information may include threshold information corresponding to at least some of the measurement targets. That is, the number of measurement targets carried in the measurement configuration message is greater than or equal to the number of groups of threshold information carried in the measurement configuration message. The UE may perform measurement according to the measurement target indicated by the measurement configuration message, and acquires indication information by performing judgment corresponding to the threshold information indicated by the measurement configuration message.

In one embodiment, the measurement configuration message includes a Radio Resource Control (RRC) connection release message or a system message.

In the embodiment, the UE may acquire the measurement target and the threshold information through an RRC connection release message or a system message. There are multiple ways to acquire the measurement target and the threshold information, allowing the UE to acquire the measurement target and the threshold information in time.

In one embodiment, the threshold information includes at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

The present embodiment provides multiple types of threshold information. The UE may support configuration of multiple types of threshold information and measurement result related judgments, facilitating flexible configuration by the base station.

In one embodiment, the indication information occupies 1 bit, and indicates whether the measurement result for the measurement target corresponding to the threshold information each meets the threshold information corresponding to the measurement target corresponding to the threshold information.

In the embodiment, when the value of the indication information is the first value (such as 1), it means that all measurement results of the measurement target configured with threshold information meet the respective threshold information. When the value of the indication information is the second value (such as 0), it means that not all measurement results of the measurement target configured with threshold information meet the respective threshold information. In the embodiment, the indication information occupies few bits, saving network resources.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

In the present embodiment, one measurement target configured with threshold information corresponds to one bit of indication information. When the value of the indication information of the one measurement target is a first value (such as 1), it means that each measurement result for the one measurement target meets respective threshold information. When the value of the indication information is the second value (such as 0), it means that not each measurement result for the one measurement target meets respective threshold information. Compared to the last embodiment, with the present embodiment, more bits are occupied, and the solution is more informative.

Alternatively, the number of bits occupied by the indication information equals the number of pieces of all threshold information corresponding to all measurement targets. That is, indication information corresponding to one piece of threshold information corresponding to one measurement target may occupy 1 bit. When the value of the indication information is a first value (such as 1), it means that a measurement result meets the one piece of threshold information corresponding to the measurement result. When the value of the indication information is a second value (such as 0), it means that the measurement result fails to meet the one piece of threshold information corresponding to the measurement result. With the embodiment, more detailed indication information is reported.

In one embodiment, the Msg1 or the Msg3 includes one of a random access request message, a Radio Resource Control (RRC) connection request message, an RRC connection resume request message, and an RRC connection reestablishment request message.

In the embodiment, the Msg1 or the Msg3 may be a first step in a random access process, such as a random access request message. The Msg3 may be a third step in the random access process. The Msg1 or the Msg3 may also be RRC signaling that occurs during RRC connection setup, RRC connection resume, and RRC connection re-establishment. The UE may report the indication information in all of the processes, in a timely fashion.

In one embodiment, when the Msg1 or the Msg3 is the random access request message, the indication information includes at least one of a preamble or a time-frequency resource for sending the preamble.

In the embodiment, when the indication information is acquired in a random access process, the preamble and/or the time-frequency resource for sending the preamble may be taken as the indication information, reducing exclusive network resource occupation by the indication information.

For example, the indication information is configured to indicate whether the measurement result for the measurement target corresponding to the threshold information each meets respective threshold information. Then, the indication information may have two values. Preambles may be divided into two groups. The first group of preambles correspond to the first value of the indication information, and the second group of preambles correspond to the second value of the indication information. When the measurement result for the measurement target corresponding to the threshold information each meets respective threshold information, a preamble is randomly selected from the first group of preambles and applied to the present random access request. When not each measurement result for the measurement target corresponding to the threshold information meets respective threshold information, a preamble is randomly selected from the second group of preambles and applied to the present random access request. The base station may determine the value of the indication information corresponding to the group including the received preamble. Similarly, time-frequency resources for sending preambles may be divided into two groups. The base station may determine the value of the indication information corresponding to the time-frequency resource bearing the received preamble.

As another example, the number of bits occupied by the indication information equals the number of measurement targets corresponding to the threshold information. One bit of indication information may be configured to indicate whether each measurement result for one measurement target corresponding to the threshold information meets threshold information corresponding to the each measurement result. For example, there are two measurement targets corresponding to two pieces of indication information, and there are a total of four values. Then, the preamble may be divided into four groups. The base station may determine the value of the indication information corresponding to the group including the received preamble.

Alternatively, time-frequency resources for transmitting preambles may be divided into four groups, and the base station may determine the value of the indication information corresponding to the time-frequency resource bearing the received preamble.

Alternatively, preambles as well as time-frequency resources for sending the preambles may be divided into two groups, respectively, with 4 combinations of the two divisions. For example, the first group of preambles may be combined with the first group of time-frequency resources, the first group of preambles may be combined with the second group of time-frequency resources, the second group of preambles may be combined with the first group of time-frequency resources, and the second group of preambles may be combined with the second group of time-frequency resources. The base station may determine the value of the indication information corresponding to the received preamble and the time-frequency resource bearing the received preamble.

Of course, a new field may be added to a random access request message for transmitting the indication information. Alternatively, the indication information may occupy an existing reserved field or a reserved value of an existing field in the random access request message.

In one embodiment, when the Msg1 or the Msg3 is the RRC connection request message, the RRC connection resume request message, or the RRC connection reestablishment request message, the indication information occupies a new field, an existing reserved field, or a reserved value of an existing field in the message.

In the embodiment, a new field may be added to RRC signaling for transmitting the indication information. Alternatively, an existing reserved field in the RRC signaling may be used for transmitting the indication information. Alternatively, a reserved value of an existing field in the RRC signaling may be taken as the value of the indication information. For example, a field may have five values, of which three being used in RRC signaling, and two being reserved values. In this case, the two reserved values may be taken as values of the indication information indicating whether each measurement result of a measurement target corresponding to the threshold information meets threshold information corresponding to the each measurement result.

In one embodiment, the method further includes a step D.

In step D, UE capability information reporting message may be sent to the base station. The UE capability information reporting message may include UE capability information. The UE capability information may indicate whether the UE supports carrying the indication information in the Msg1 or the Msg3.

In the embodiment, by sending a UE capability information reporting message, the UE may inform the base station whether the UE supports carrying the indication information in a Msg1 or a Msg3. The UE may take the initiatives in reporting the UE capability information reporting message, or the base station may instruct the UE to report the UE capability information reporting message. Having learned that the UE supports reporting the indication information, the base station may configure the threshold information for the UE. If most UE covered by the base station support reporting of the indication information, the base station may configure the threshold information through a system message. If just a few UE covered by the base station support reporting of indication information, the base station may configure the threshold information through an RRC connection release message.

In one embodiment, the method further includes a step E.

In step E, a configuration message of dual connectivity (DC) and/or carrier aggregation (CA) sent by the base station may be received. The configuration message may include a Radio Resource Control (RRC) connection setup message, an RRC connection resume message, or an RRC connection reestablishment message.

In the embodiment, having reported the indication information, the UE may acquire DC and/or CA configured for the UE by the base station. DC/CA configuration information may be acquired through an RRC connection setup message, an RRC connection resume message, or an RRC connection reestablishment message. The RRC connection setup message may be a message 4 (Msg4) in a random access process. Therefore, the UE may acquire DC/CA configuration in a random access process, an RRC connection setup process, an RRC connection resume process, and an RRC connection re-establishment process.

In one embodiment, the method further includes a step F.

In step F, in response to reselection to a new cell, or leaving an original cell and then failing to return to the original cell within a preset period of time, the measurement target and the threshold information may be released.

In the embodiment, when reselecting a new cell, the UE may release the measurement target and the threshold information corresponding to the measurement target regarding the original cell so as to acquire a measurement target and threshold information corresponding to the measurement target regarding the new cell. Alternatively, after leaving the original cell, the UE may reselect, or hand over to, the new cell. Instead of immediately releasing the measurement target and the threshold information corresponding to the measurement target regarding the original cell, the UE may release the measurement target and the threshold information corresponding to the measurement target regarding the original cell after not returning to the original cell within a preset period of time, reducing frequent acquisition and release of the measurement target and the threshold information corresponding to the measurement target due to that the UE keeps changing the cell back and forth.

In one embodiment, the measurement target includes at least one of a measurement frequency or a cell.

In the embodiment, the measurement target may be a measurement frequency or a cell. The base station may perform configuration flexibly as needed.

Implementation at the UE side will be elaborated below with embodiments.

Figure 4:
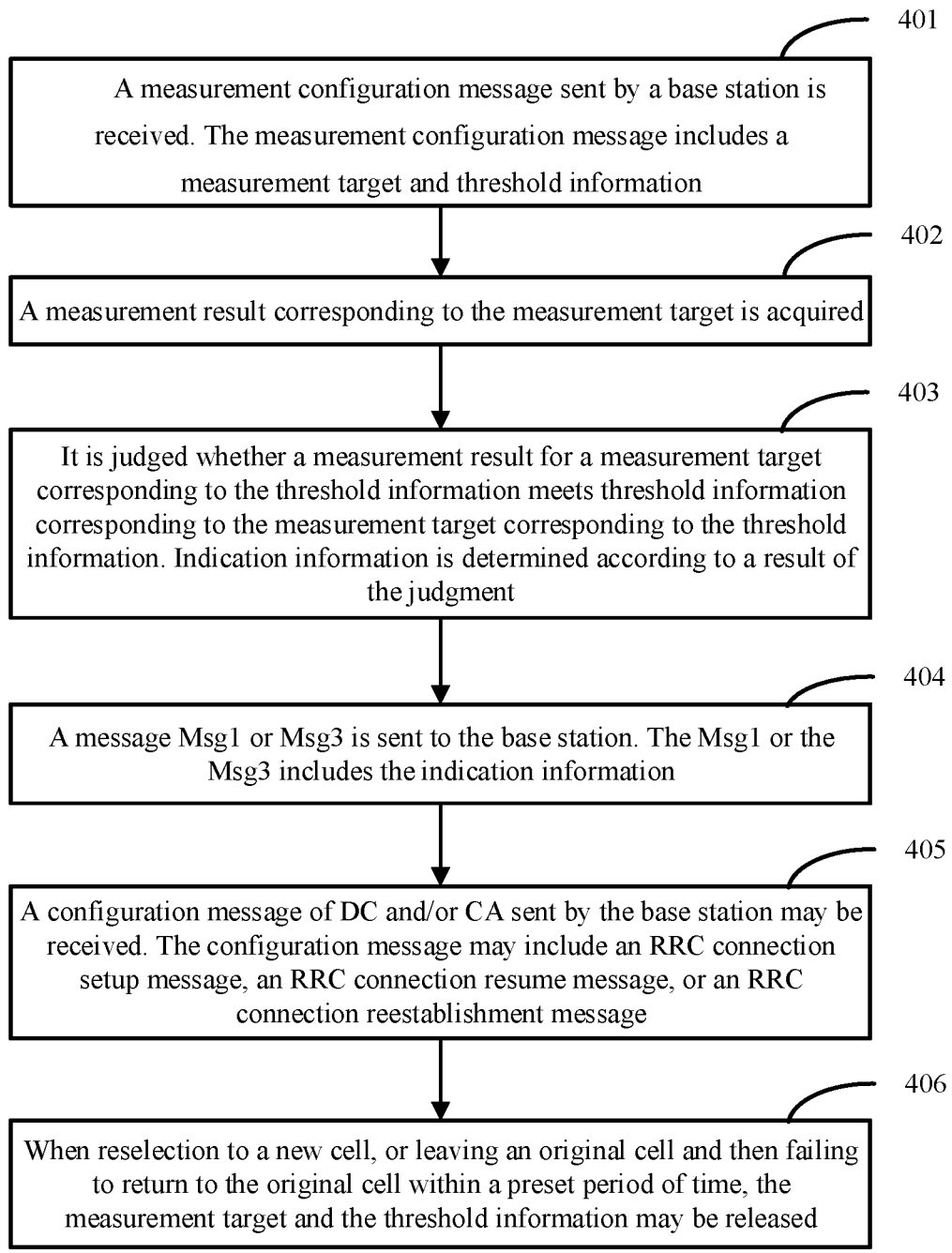
FIG. 4 is a flowchart of a method for transmitting measurement-related information according to an illustrative embodiment.

FIG. 4 is a flowchart of a method for transmitting measurement-related information according to an illustrative embodiment. The method is applied to UE. The UE may be a mobile phone, a computer, a digital broadcasting terminal, a message transceiver, a game console, tablet equipment, medical equipment, fitness equipment, a Personal Digital Assistant (PDA), etc. As shown in FIG. 4, the method includes steps 401-406 as follows.

In Step 401, a measurement configuration message sent by a base station is received. The measurement configuration message includes a measurement target and threshold information.

In Step 402, a measurement result corresponding to the measurement target is acquired.

In Step 403, it is judged whether a measurement result for a measurement target corresponding to the threshold information meets threshold information corresponding to the measurement target corresponding to the threshold information. Indication information is determined according to a result of the judgment.

In Step 404, a message Msg1 or Msg3 is sent to the base station. The Msg1 or the Msg3 includes the indication information.

In Step 405, a configuration message of dual connectivity (DC) and/or carrier aggregation (CA) sent by the base station may be received. The configuration message may include a Radio Resource Control (RRC) connection setup message, an RRC connection resume message, or an RRC connection reestablishment message.

In Step 406, in response to reselection to a new cell, or leaving an original cell and then failing to return to the original cell within a preset period of time, the measurement target and the threshold information may be released.

Implementation is introduced below with reference to both the base station and the UE.

Figure 5:
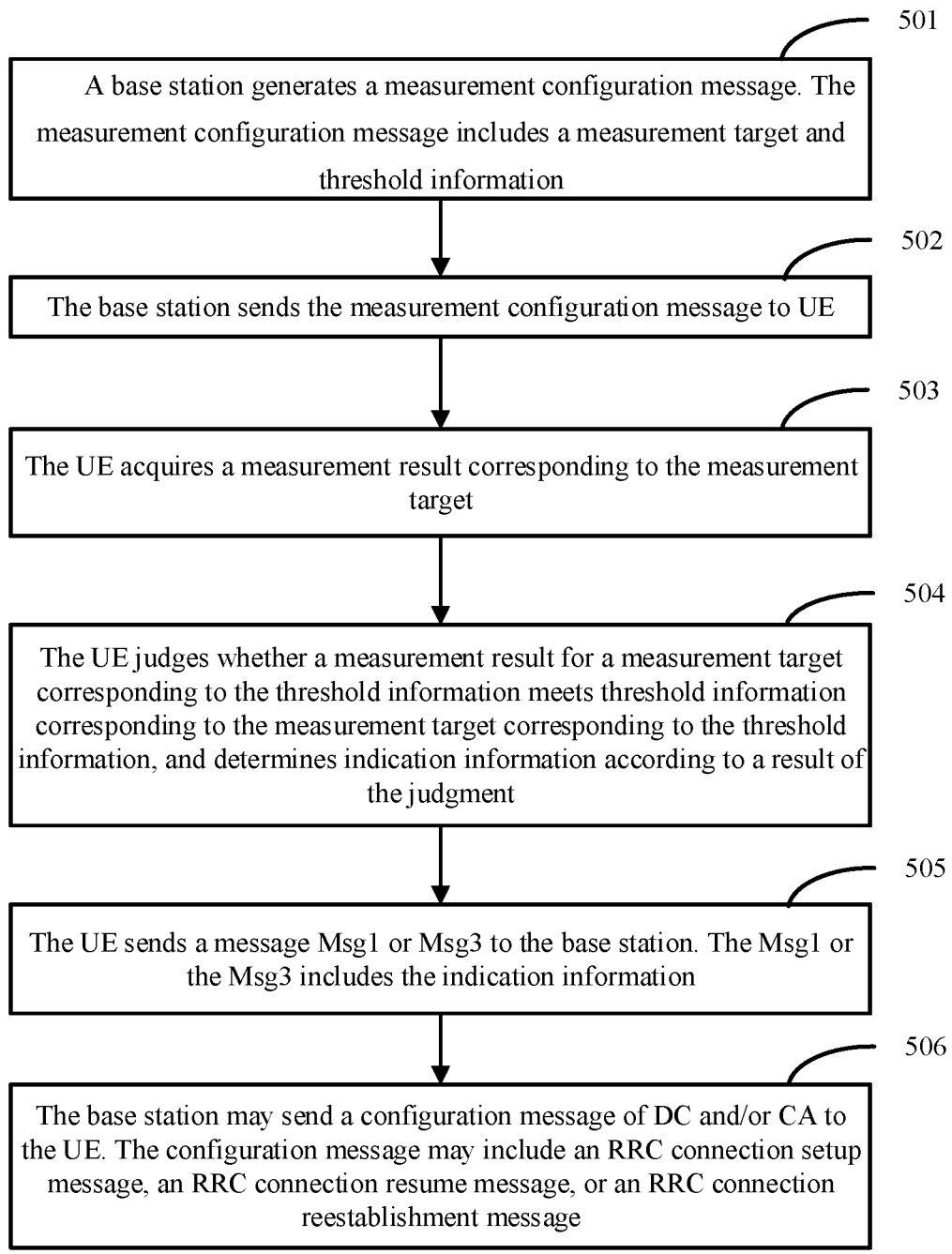
FIG. 5 is a flowchart of a method for transmitting measurement-related information according to an illustrative embodiment.

FIG. 5 is a flowchart of a method for transmitting measurement-related information according to an illustrative embodiment. As shown in FIG. 5, the method includes steps 501-506 as follows.

In Step 501, a base station generates a measurement configuration message. The measurement configuration message includes a measurement target and threshold information.

In Step 502, the base station sends the measurement configuration message to user equipment (UE).

In Step 503, the UE acquires a measurement result corresponding to the measurement target.

In Step 504, the UE judges whether a measurement result for a measurement target corresponding to the threshold information meets threshold information corresponding to the measurement target corresponding to the threshold information, and determines indication information according to a result of the judgment.

In Step 505, the UE sends a message Msg1 or Msg3 to the base station. The Msg1 or the Msg3 includes the indication information.

In Step 506, the base station may send a configuration message of dual connectivity (DC) and/or carrier aggregation (CA) to the UE. The configuration message may include a Radio Resource Control (RRC) connection setup message, an RRC connection resume message, or an RRC connection reestablishment message.

The embodiments may be combined freely as needed.

Device embodiments according to the present disclosure are described below, and may be used to implement the method embodiments of the present disclosure.

Figure 6:
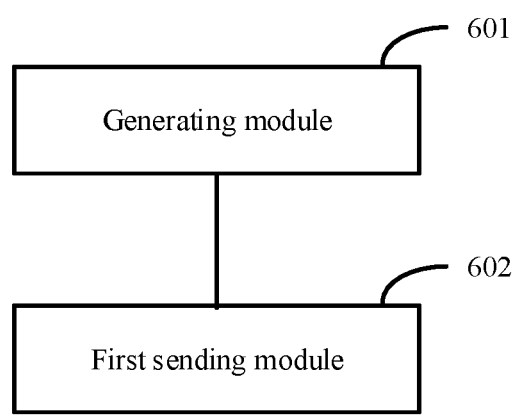
FIG. 6 is a block diagram of a device for transmitting measurement-related information according to an illustrative embodiment.

FIG. 6 is a block diagram of a device for transmitting measurement-related information according to an illustrative embodiment. The device may be implemented as part or all of electronic equipment using software, hardware, or a combination of software and hardware. The device is applied to a base station. Referring to FIG. 6, the device includes a generating module 601 and a first sending module 602.

The generating module 601 is configured to generate a measurement configuration message. The measurement configuration message includes a measurement target and threshold information.

The first sending module 602 is configured to send the measurement configuration message to user equipment (UE).

In one embodiment, when there is a plurality of the measurement target, the threshold information includes threshold information corresponding to at least a portion of the measurement target.

In one embodiment, the measurement configuration message includes a Radio Resource Control (RRC) connection release message or a system message.

In one embodiment, the threshold information includes at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

Figure 7:
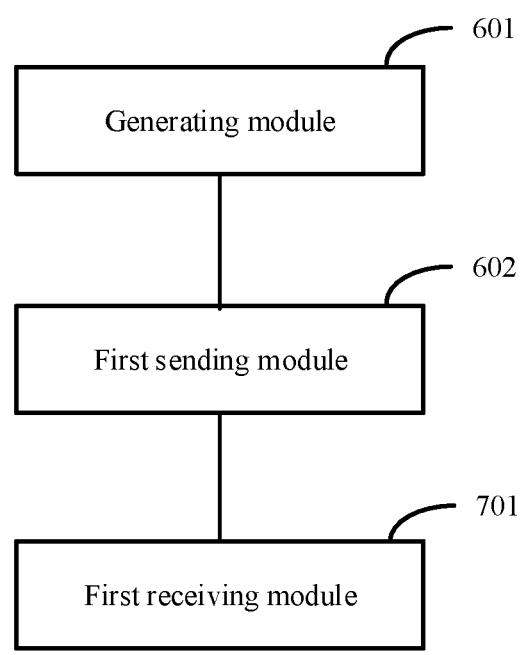
FIG. 7 is a block diagram of a device for transmitting measurement-related information according to an illustrative embodiment.

In one embodiment, as shown in FIG. 7, the device further includes a first receiving module 701.

The first receiving module 701 may be configured to receive a message Msg1 or Msg3 sent by the UE. The Msg1 or the Msg3 may include indication information indicating whether a measurement result for a measurement target corresponding to the threshold information meets threshold information corresponding to the measurement target corresponding to the threshold information.

In one embodiment, the indication information occupies 1 bit, and indicates whether the measurement result for the measurement target corresponding to the threshold information each meets the threshold information corresponding to the measurement target corresponding to the threshold information.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

In one embodiment, the Msg1 or the Msg3 includes one of a random access request message, a Radio Resource Control (RRC) connection request message, an RRC connection resume request message, and an RRC connection reestablishment request message.

In one embodiment, when the Msg1 or the Msg3 is the random access request message, the indication information includes at least one of a preamble or a time-frequency resource for sending the preamble.

In one embodiment, when the Msg1 or the Msg3 is the RRC connection request message, the RRC connection resume request message, or the RRC connection reestablishment request message, the indication information occupies a new field, an existing reserved field, or a reserved value of an existing field in the message.

Figure 8:
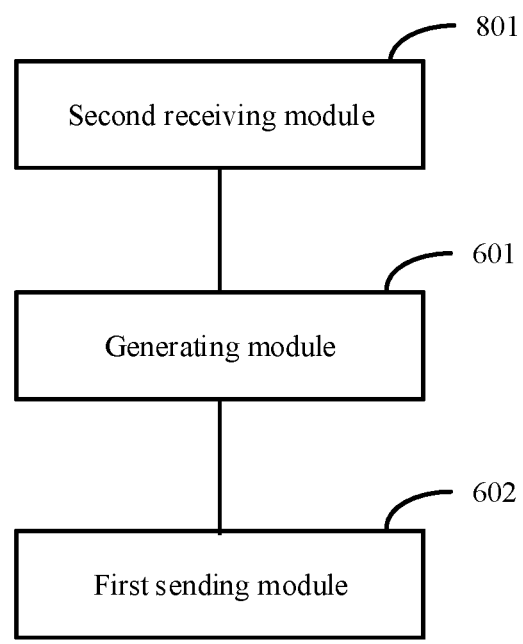
FIG. 8 is a block diagram of a device for transmitting measurement-related information according to an illustrative embodiment.

In one embodiment, as shown in FIG. 8, the device further includes a second receiving module 801.

The second receiving module 801 may be configured to receive UE capability information reporting message sent by the UE. The UE capability information reporting message may include UE capability information. The UE capability information may indicate whether the UE supports carrying the indication information in the Msg1 or the Msg3.

Figure 9:
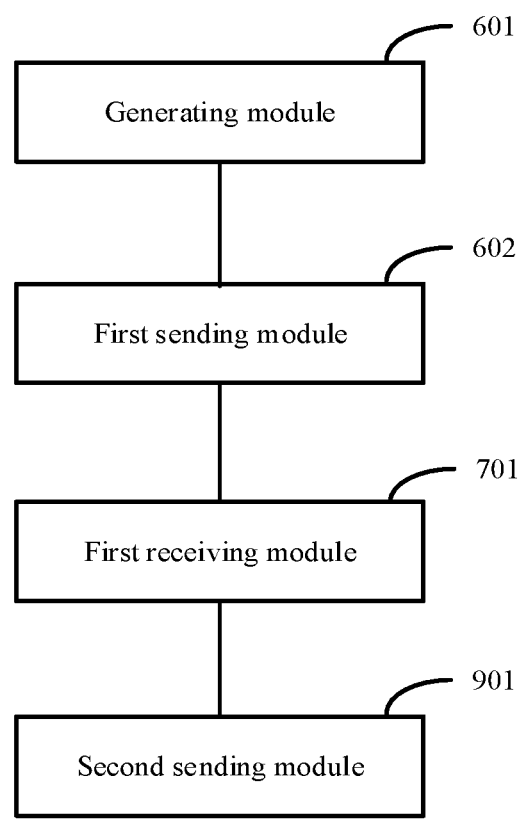
FIG. 9 is a block diagram of a device for transmitting measurement-related information according to an illustrative embodiment.

In one embodiment, as shown in FIG. 9, the device further includes a second sending module 901.

The second sending module 901 may be configured to send a configuration message of dual connectivity (DC) and/or carrier aggregation (CA) to the UE. The configuration message may include a Radio Resource Control (RRC) connection setup message, an RRC connection resume message, or an RRC connection reestablishment message.

In one embodiment, the measurement target includes at least one of a measurement frequency or a cell.

Figure 10:
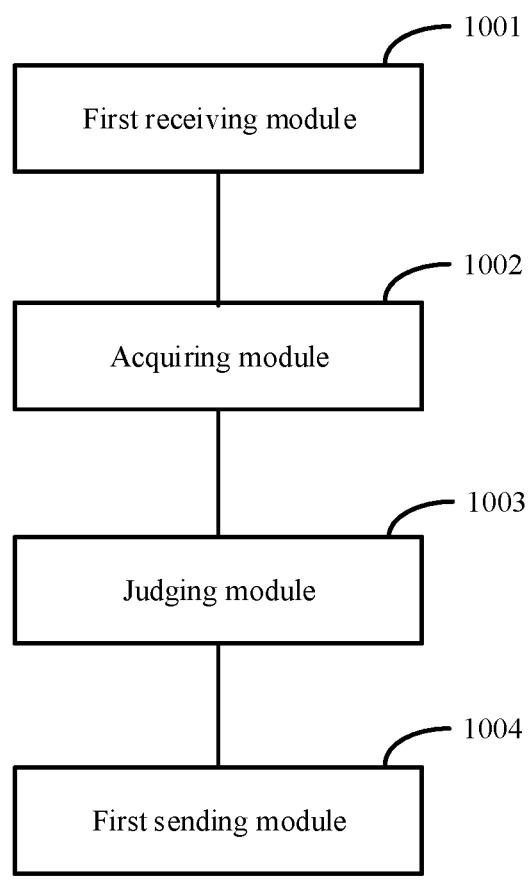
FIG. 10 is a block diagram of a device for transmitting measurement-related information according to an illustrative embodiment.

FIG. 10 is a block diagram of a device for transmitting measurement-related information according to an illustrative embodiment. The device may be implemented as part or all of electronic equipment using software, hardware, or a combination of software and hardware. The device is applied to UE. Referring to FIG. 10, the device includes a first receiving module 1001, an acquiring module 1002, a judging module 1003, and a first sending module 1004.

The first receiving module 1001 may be configured to receive a measurement configuration message sent by a base station. The measurement configuration message includes a measurement target and threshold information.

The acquiring module 1002 may be configured to acquire a measurement result corresponding to the measurement target.

The judging module 1003 may be configured to judge whether a measurement result for a measurement target corresponding to the threshold information meets threshold information corresponding to the measurement target corresponding to the threshold information, and determine indication information according to a result of the judgment.

The first sending module 1004 may be configured to send a message Msg1 or Msg3 to the base station. The Msg1 or the Msg3 includes the indication information.

In one embodiment, when there is a plurality of the measurement target, the threshold information includes threshold information corresponding to at least a portion of the measurement target.

In one embodiment, the measurement configuration message includes a Radio Resource Control (RRC) connection release message or a system message.

In one embodiment, the threshold information includes at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

In one embodiment, the indication information occupies 1 bit, and indicates whether the measurement result for the measurement target corresponding to the threshold information each meets the threshold information corresponding to the measurement target corresponding to the threshold information.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

In one embodiment, the Msg1 or the Msg3 includes one of a random access request message, a Radio Resource Control (RRC) connection request message, an RRC connection resume request message, and an RRC connection reestablishment request message.

In one embodiment, when the Msg1 or the Msg3 is the random access request message, the indication information includes at least one of a preamble or a time-frequency resource for sending the preamble.

In one embodiment, when the Msg1 or the Msg3 is the RRC connection request message, the RRC connection resume request message, or the RRC connection reestablishment request message, the indication information occupies a new field, an existing reserved field, or a reserved value of an existing field in the message.

Figure 11:
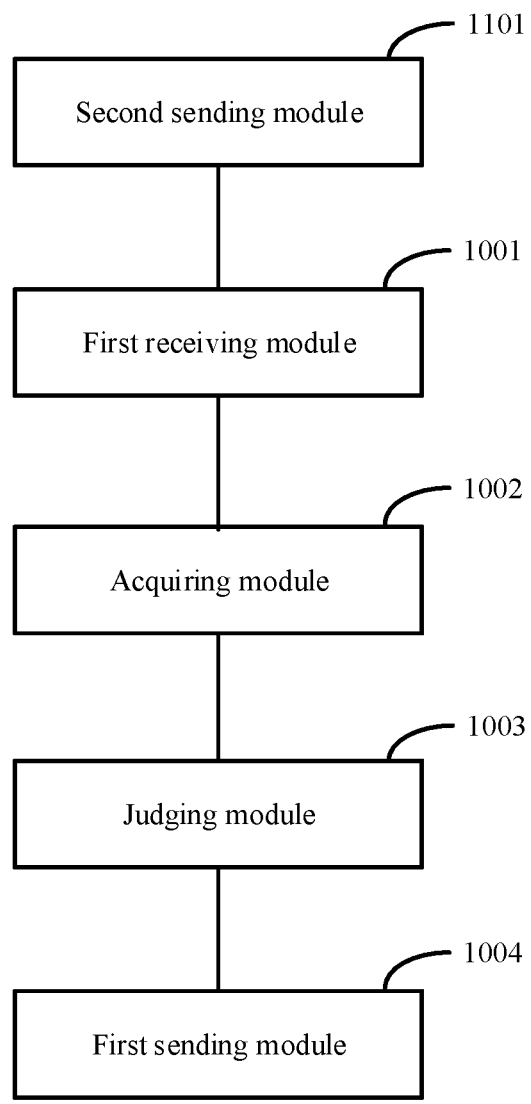
FIG. 11 is a block diagram of a device for transmitting measurement-related information according to an illustrative embodiment.
Figure 12:
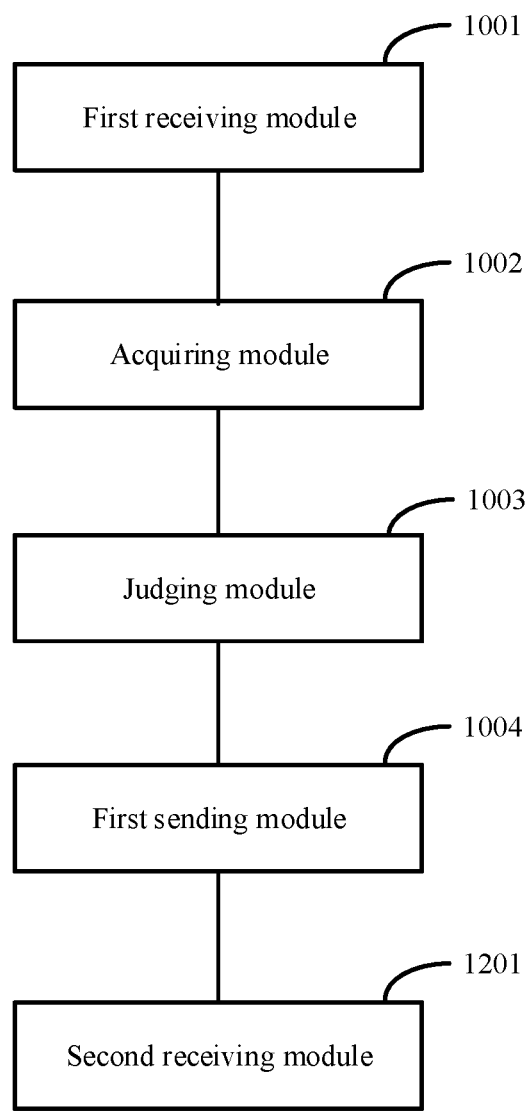
FIG. 12 is a block diagram of a device for transmitting measurement-related information according to an illustrative embodiment.

In one embodiment, as shown in FIG. 11, the device further includes a second sending module 1101.

The second sending module 1101 may be configured to send UE capability information reporting message to the base station. The UE capability information reporting message may include UE capability information. The UE capability information may indicate whether the UE supports carrying the indication information in the Msg1 or the Msg3.

In one embodiment, as shown, the device further includes a second receiving module 1201.

The second receiving module 1201 may be configured to receive a configuration message of dual connectivity (DC) and/or carrier aggregation (CA) sent by the base station. The configuration message may include a Radio Resource Control (RRC) connection setup message, an RRC connection resume message, or an RRC connection reestablishment message.

Figure 13:
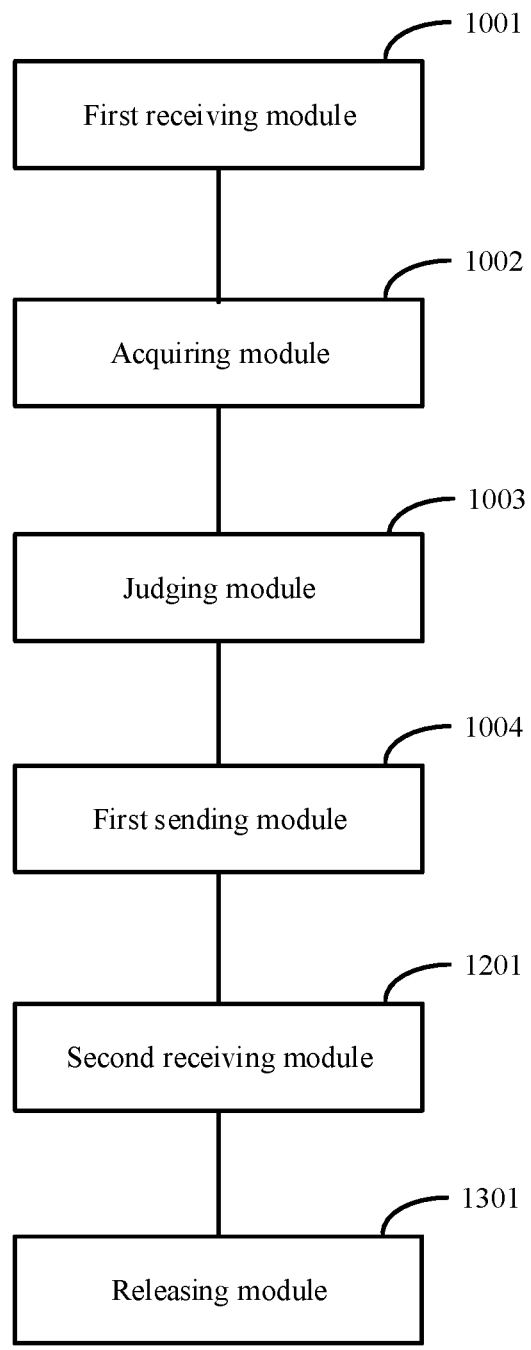
FIG. 13 is a block diagram of a device for transmitting measurement-related information according to an illustrative embodiment.

In one embodiment, as shown in FIG. 13, the device further includes a releasing module 1301.

The releasing module 1301 may be configured to, in response to reselection to a new cell, or leaving an original cell and then failing to return to the original cell within a preset period of time, release the measurement target and the threshold information.

In one embodiment, the measurement target includes at least one of a measurement frequency or a cell.

A module of the device according to an aforementioned embodiment here may perform an operation in a mode elaborated in an aforementioned embodiment of the method herein, which will not be repeated here.

Figure 14:
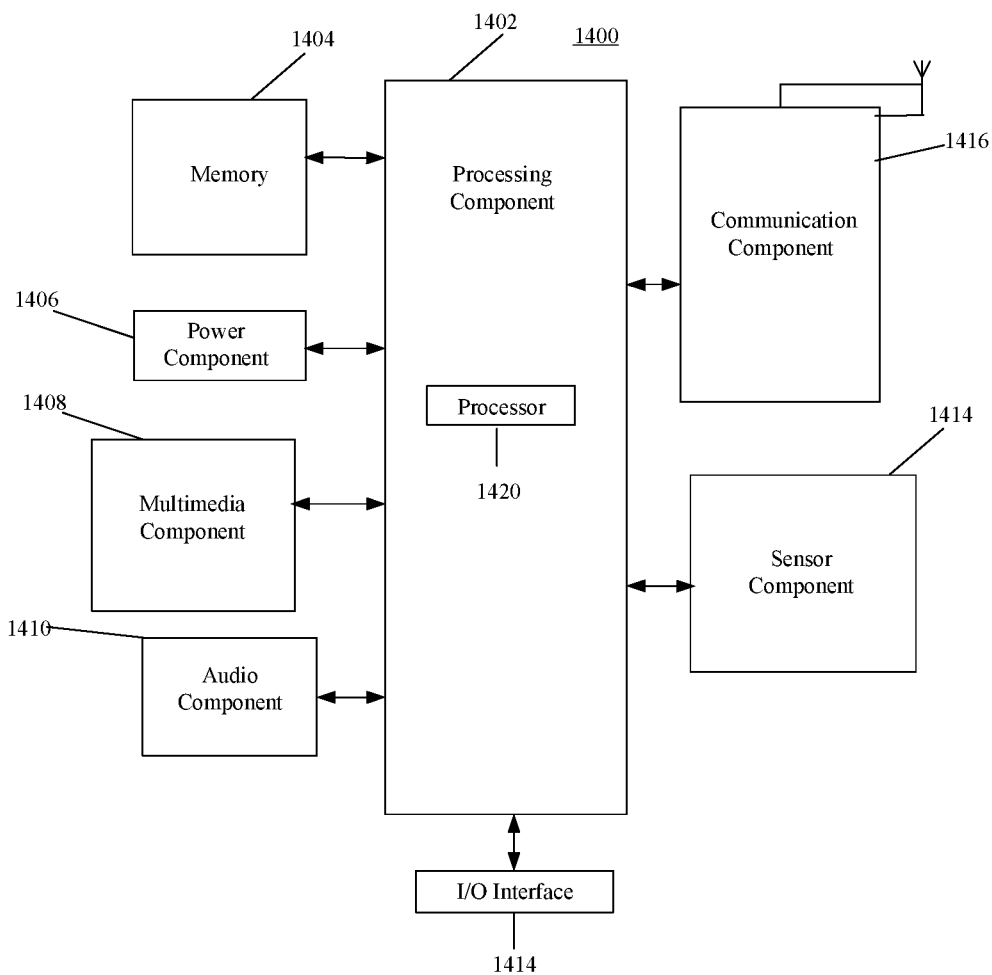
FIG. 14 is a block diagram of a device for transmitting measurement-related information according to an illustrative embodiment.

FIG. 14 is a block diagram of a device for transmitting measurement-related information according to an illustrative embodiment. For example, the device 1400 may be a mobile phone, a computer, a digital broadcasting terminal, a message transceiver, a game console, tablet equipment, medical equipment, fitness equipment, a Personal Digital Assistant (PDA), etc.

The device 1400 may include one or more components as follows: a processing component 1402, a memory 1404, a power component 1406, a multimedia component 1408, an audio component 1410, an Input/Output (I/O) interface 1414, a sensor component 1414, and a communication component 1416.

The processing component 1402 generally controls an overall operation of the device 1400, such as operations associated with display, a telephone call, data communication, a camera operation, a recording operation, etc. The processing component 1402 may include one or more processors 1420 to execute instructions so as to complete all or some steps of the method. In addition, the processing component 1402 may include one or more modules to facilitate interaction between the processing component 1402 and other components. For example, the processing component 1402 may include a multimedia module to facilitate interaction between the multimedia component 1408 and the processing component 1402.

The memory 1404 is configured to store various types of data to support operation on the device 1400. Examples of these data include instructions of any application or method configured to operate on the device 1400, contact data, phonebook data, messages, images, videos, and/etc. The memory 1404 may be implemented by any type of volatile or non-volatile storage equipment or combination of the volatile or non-volatile storage equipment, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 1406 supplies electric power to various components of the device 1400. The power component 1406 may include a power management system, one or more power supplies, and other components related to generating, managing and distributing electric power for the device 1400.

The multimedia component 1408 includes a screen providing an output interface between the device 1400 and a user. The screen may include a Liquid Crystal Display (LCD) and a Touch Panel (TP). If the screen includes a TP, the screen may be implemented as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some embodiments, the multimedia component 1408 includes a front camera and/or a rear camera. When the device 1400 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 1410 is configured to output and/or input an audio signal. For example, the audio component 1410 includes a microphone (MIC). When the device 1400 is in an operation mode such as a call mode, a recording mode, and a voice recognition mode, the MIC is configured to receive an external audio signal. The received audio signal may be further stored in the memory 1404 or may be sent via the communication component 1416. In some embodiments, the audio component 1410 further includes a loudspeaker configured to output the audio signal.

The I/O interface 1414 provides an interface between the processing component 1402 and a peripheral interface module. The peripheral interface module may be a keypad, a click wheel, a button, etc. These buttons may include but are not limited to: a homepage button, a volume button, a start button, and a lock button.

The sensor component 1414 includes one or more sensors for assessing various states of the device 1400. For example, the sensor component 1414 may detect an on/off state of the device 1400 and relative location of components such as the display and the keypad of the device 1400. The sensor component 1414 may further detect a change in the location of the device 1400 or of a component of the device 1400, whether there is contact between the device 1400 and a user, the orientation or acceleration/deceleration of the device 1400, and a change in the temperature of the device 1400. The sensor component 1414 may include a proximity sensor configured to detect existence of a nearby object without physical contact. The sensor component 1414 may further include an optical sensor such as a Complementary Metal-Oxide-Semiconductor (CMOS) or Charge-Coupled-Mobile terminal 800 (CCD) image sensor used in an imaging application. In some embodiments, the sensor component 1414 may further include an acceleration sensor, a gyroscope sensor, a magnetic sensor, a pressure sensor, or a temperature sensor.

The communication component 1416 is configured to facilitate wired or wireless/radio communication between the device 1400 and other equipment. The device 1400 may access a radio network based on a communication standard such as WiFi, 2G, 3G, . . . , or a combination of the any communication standard. In an illustrative embodiment, the communication component 1416 broadcasts related information or receives a broadcast signal from an external broadcast management system via a broadcast channel. In an illustrative embodiment, the communication component 1416 further includes a Near Field Communication (NFC) module for short-range communication. For example, the NFC module may be implemented based on Radio Frequency Identification (RFID), Infrared Data Association (IrDA), Ultra-WideBand (UWB) technology, BlueTooth (BT) technology, and other technologies.

In an illustrative embodiment, the device 1400 may be implemented by one or more of Application Specific Integrated Circuits (ASIC), Digital Signal Processors (DSP), Digital Signal Processing Mobile terminal 800 (DSPD), Programmable Logic Mobile terminal 800s (PLD), Field Programmable Gate Arrays (FPGA), controllers, microcontrollers, microprocessors or other electronic components, to implement the method.

In an illustrative embodiment, a non-transitory computer-readable storage medium including instructions, such as the memory 1404 including instructions, is further provided. The instructions may be executed by the processor 1420 of the device 1400 to implement an aforementioned method. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

In an illustrative embodiment, there is provided a device for transmitting measurement-related information.

The device includes a processor and a memory configured to store processor executable instructions.

The processor is configured to implement:
receiving a measurement configuration message sent by a base station, the measurement configuration message comprising a measurement target and threshold information;
acquiring a measurement result corresponding to the measurement target;
judging whether a measurement result for a measurement target corresponding to the threshold information meets threshold information corresponding to the measurement target corresponding to the threshold information, and determining indication information according to a result of the judgment; and
sending a message Msg1 or Msg3 to the base station, the Msg1 or the Msg3 comprising the indication information.

The processor may also be configured to:
When there is a plurality of the measurement target, the threshold information includes threshold information corresponding to at least a portion of the measurement target.

The processor may also be configured to:
The measurement configuration message includes a Radio Resource Control (RRC) connection release message or a system message.

The processor may also be configured to:
The threshold information includes at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

The processor may also be configured to:
The indication information occupies 1 bit, and indicates whether the measurement result for the measurement target corresponding to the threshold information each meets the threshold information corresponding to the measurement target corresponding to the threshold information.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

The processor may also be configured to:
The Msg1 or the Msg3 includes one of a random access request message, a Radio Resource Control (RRC) connection request message, an RRC connection resume request message, and an RRC connection reestablishment request message.

The processor may also be configured to:
When the Msg1 or the Msg3 is the random access request message, the indication information includes at least one of a preamble or a time-frequency resource for sending the preamble.

The processor may also be configured to:
When the Msg1 or the Msg3 is the RRC connection request message, the RRC connection resume request message, or the RRC connection reestablishment request message, the indication information occupies a new field, an existing reserved field, or a reserved value of an existing field in the message.

The processor may also be configured to:
The method further includes:
sending UE capability information reporting message to the base station. The UE capability information reporting message may include UE capability information. The UE capability information may indicate whether the UE supports carrying the indication information in the Msg1 or the Msg3.

The processor may also be configured to:
The method further includes:
receiving a configuration message of dual connectivity (DC) and/or carrier aggregation (CA) sent by the base station. The configuration message may include a Radio Resource Control (RRC) connection setup message, an RRC connection resume message, or an RRC connection reestablishment message.

The processor may also be configured to:
The method further includes:
in response to reselection to a new cell, or leaving an original cell and then failing to return to the original cell within a preset period of time, releasing the measurement target and the threshold information.

The processor may also be configured to:
The measurement target includes at least one of a measurement frequency or a cell.

A computer-readable storage medium has stored thereon computer instructions which when executed by a processor of a device, allow the device to implement the method for transmitting measurement-related information. The method includes:
receiving a measurement configuration message sent by a base station, the measurement configuration message including a measurement target and threshold information;
acquiring a measurement result corresponding to the measurement target;
judging whether a measurement result for a measurement target corresponding to the threshold information meets threshold information corresponding to the measurement target corresponding to the threshold information, and determining indication information according to a result of the judgment; and
sending a message Msg1 or Msg3 to the base station. The Msg1 or the Msg3 includes the indication information.

The instructions in the storage medium may further include:
When there is a plurality of the measurement target, the threshold information includes threshold information corresponding to at least a portion of the measurement target.

The instructions in the storage medium may further include:

The measurement configuration message includes a Radio Resource Control (RRC) connection release message or a system message.

The instructions in the storage medium may further include:

The threshold information includes at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

The instructions in the storage medium may further include:

The indication information occupies 1 bit, and indicates whether the measurement result for the measurement target corresponding to the threshold information each meets the threshold information corresponding to the measurement target corresponding to the threshold information.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

The instructions in the storage medium may further include:

The Msg1 or the Msg3 includes one of a random access request message, a Radio Resource Control (RRC) connection request message, an RRC connection resume request message, and an RRC connection reestablishment request message.

The instructions in the storage medium may further include:

When the Msg1 or the Msg3 is the random access request message, the indication information includes at least one of a preamble or a time-frequency resource for sending the preamble.

The instructions in the storage medium may further include:

When the Msg1 or the Msg3 is the RRC connection request message, the RRC connection resume request message, or the RRC connection reestablishment request message, the indication information occupies a new field, an existing reserved field, or a reserved value of an existing field in the message.

The instructions in the storage medium may further include:

The method further includes:
sending UE capability information reporting message to the base station. The UE capability information reporting message may include UE capability information. The UE capability information may indicate whether the UE supports carrying the indication information in the Msg1 or the Msg3.

The instructions in the storage medium may further include:

The method further includes:
receiving a configuration message of dual connectivity (DC) and/or carrier aggregation (CA) sent by the base station. The configuration message may include a Radio Resource Control (RRC) connection setup message, an RRC connection resume message, or an RRC connection reestablishment message.

The instructions in the storage medium may further include:

The method further includes:
in response to reselection to a new cell, or leaving an original cell and then failing to return to the original cell within a preset period of time, releasing the measurement target and the threshold information.

The instructions in the storage medium may further include:

The measurement target includes at least one of a measurement frequency or a cell.

Figure 15:
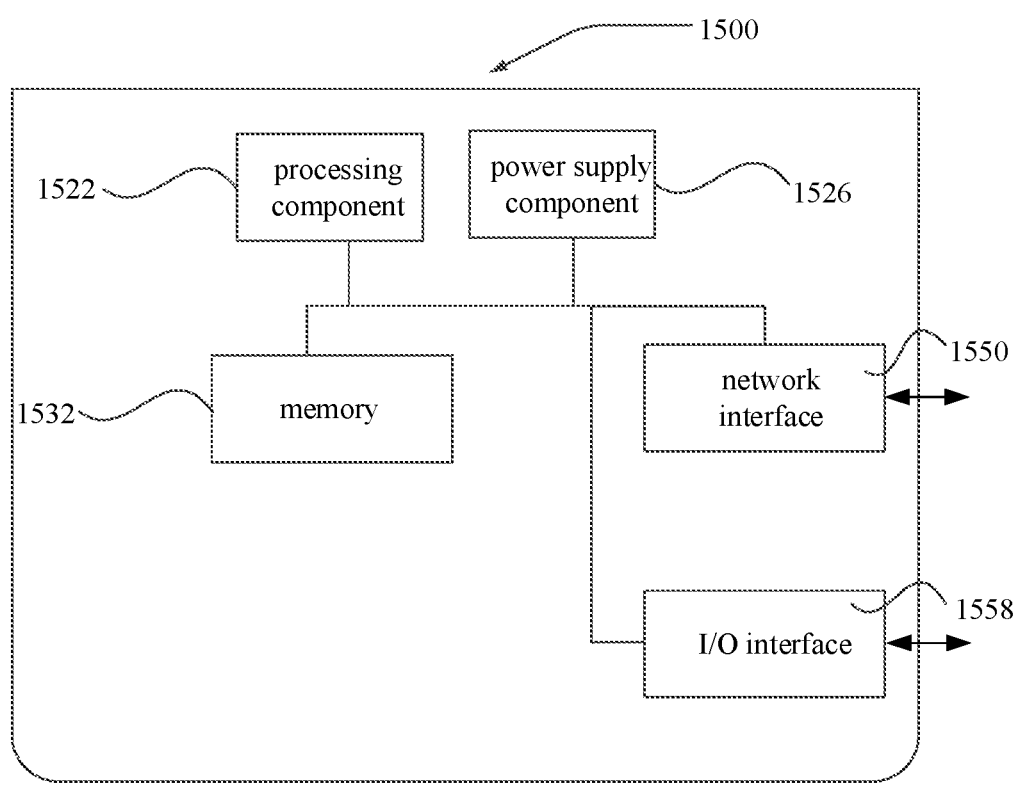
FIG. 15 is a block diagram of a device for transmitting measurement-related information according to an illustrative embodiment.

FIG. 15 is a block diagram of a device 1500 for synchronizing data according to an illustrative embodiment. For example, the device 1500 may be provided as a computer. Referring to FIG. 15, the device 1500 may include a processing component 1522. The processing component may include one or more processors. The device may include a memory resource represented by memory 1532. The memory resource may be configured to store an instruction executable by the processing component 1522, such as an APP. The APP stored in the memory 1532 may include one or more modules. Each of the one or more modules may correspond to a group of instructions. In addition, the processing component 1522 may be configured to execute instructions to perform the method for synchronizing data.

The device 1500 may further include a power supply component 1526. The power supply component may be configured to manage power of the device 1500. The device may further include a wired or wireless network interface 1550 configured to connect the device 1500 to a network. The device may further include an Input/Output (I/O) interface 1558. The device 1500 may operate based on an operating system stored in the memory 1532, such as a Windows Server™, a Mac OS X™, a Unix™, a Linux™, a FreeBSD™, etc.

In an illustrative embodiment, there is provided a device for transmitting measurement-related information.

The device include a processor and a memory configured to store processor executable instructions.

The processor is configured to implement:
generating a measurement configuration message, the measurement configuration message comprising a measurement target and threshold information; and
sending the measurement configuration message to user equipment (UE).

The processor may also be configured to:
When there is a plurality of the measurement target, the threshold information includes threshold information corresponding to at least a portion of the measurement target.

The processor may also be configured to:
The measurement configuration message includes a Radio Resource Control (RRC) connection release message or a system message.

The processor may also be configured to:
The threshold information includes at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

The processor may also be configured to:

The method further includes:

receiving a message Msg1 or Msg3 sent by the UE. The Msg1 or the Msg3 may include indication information indicating whether a measurement result for a measurement target corresponding to the threshold information meets threshold information corresponding to the measurement target corresponding to the threshold information.

The processor may also be configured to:

The indication information occupies 1 bit, and indicates whether the measurement result for the measurement target corresponding to the threshold information each meets the threshold information corresponding to the measurement target corresponding to the threshold information.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

The processor may also be configured to:

The Msg1 or the Msg3 includes one of a random access request message, a Radio Resource Control (RRC) connection request message, an RRC connection resume request message, and an RRC connection reestablishment request message.

The processor may also be configured to:

When the Msg1 or the Msg3 is the random access request message, the indication information includes at least one of a preamble or a time-frequency resource for sending the preamble.

The processor may also be configured to:

When the Msg1 or the Msg3 is the RRC connection request message, the RRC connection resume request message, or the RRC connection reestablishment request message, the indication information occupies a new field, an existing reserved field, or a reserved value of an existing field in the message.

The processor may also be configured to:

The method further includes:

receiving UE capability information reporting message sent by the UE. The UE capability information reporting message may include UE capability information. The UE capability information may indicate whether the UE supports carrying the indication information in the Msg1 or the Msg3.

The processor may also be configured to:

The method further includes:

sending a configuration message of dual connectivity (DC) and/or carrier aggregation (CA) to the UE. The configuration message may include a Radio Resource Control (RRC) connection setup message, an RRC connection resume message, or an RRC connection reestablishment message.

The processor may also be configured to:

The measurement target includes at least one of a measurement frequency or a cell.

A computer-readable storage medium has stored thereon computer instructions which when executed by a processor of a device, allow the device to implement the method for transmitting measurement-related information. The method includes:

generating a measurement configuration message, the measurement configuration message comprising a measurement target and threshold information; and sending the measurement configuration message to user equipment (UE).

The instructions in the storage medium may further include:

When there is a plurality of the measurement target, the threshold information includes threshold information corresponding to at least a portion of the measurement target.

The instructions in the storage medium may further include:

The measurement configuration message includes a Radio Resource Control (RRC) connection release message or a system message.

The instructions in the storage medium may further include:

The threshold information includes at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI.

The instructions in the storage medium may further include:

The method further includes:

receiving a message Msg1 or Msg3 sent by the UE. The Msg1 or the Msg3 may include indication information indicating whether a measurement result for a measurement target corresponding to the threshold information meets threshold information corresponding to the measurement target corresponding to the threshold information.

The instructions in the storage medium may further include:

The indication information occupies 1 bit, and indicates whether the measurement result for the measurement target corresponding to the threshold information each meets the threshold information corresponding to the measurement target corresponding to the threshold information.

Alternatively, a number of bits occupied by the indication information may equal a number of the measurement target corresponding to the threshold information. Of the number of bits, each bit of indication information may indicate whether each measurement result for one measurement target corresponding to the threshold information meets threshold information corresponding to the each measurement result.

The instructions in the storage medium may further include:

The Msg1 or the Msg3 includes one of a random access request message, a Radio Resource Control (RRC) connection request message, an RRC connection resume request message, and an RRC connection reestablishment request message.

The instructions in the storage medium may further include:

When the Msg1 or the Msg3 is the random access request message, the indication information includes at least one of a preamble or a time-frequency resource for sending the preamble.

The instructions in the storage medium may further include:

When the Msg1 or the Msg3 is the RRC connection request message, the RRC connection resume request message, or the RRC connection reestablishment request message, the indication information occupies a new field, an existing reserved field, or a reserved value of an existing field in the message.

The instructions in the storage medium may further include:

The method further includes:
receiving UE capability information reporting message sent by the UE. The UE capability information reporting message may include UE capability information. The UE capability information may indicate whether the UE supports carrying the indication information in the Msg1 or the Msg3.

The instructions in the storage medium may further include:

The method further includes:
sending a configuration message of dual connectivity (DC) and/or carrier aggregation (CA) to the UE. The configuration message may include a Radio Resource Control (RRC) connection setup message, an RRC connection resume message, or an RRC connection reestablishment message.

The instructions in the storage medium may further include:

The measurement target includes at least one of a measurement frequency or a cell.

Technical solutions provided by the embodiments of the present disclosure may include beneficial effects as follows: the measurement target and the threshold information are configured for the UE at the same time, improving the original measurement configuration message, allowing the UE to make a judgment regarding a measurement result and the threshold information after acquiring the measurement result, and to feed the indication information indicating the result of the judgment back to the base station; the number of measurement targets corresponding to the threshold information carried in the measurement configuration message may be equal to or less than the number of measurement targets carried in the measurement configuration message, implementing flexible configuration; the measurement configuration message may be of multiple types of messages, thereby suitable to multiple application scenes; and the threshold information may be of multiple types, thereby suitable to multiple application scenes.

Furthermore, some embodiments may achieve beneficial effects as follows: provided with a new kind of indication information, the base station may acquire the indication information through the Msg1 or the Msg3, saving judgment on a measurement result, and may acquire the indication information timely, facilitating subsequent processing by the base station; the indication information may have multiple meanings, and occupy different numbers of bits, thereby suitable to multiple application scenes; the Msg1 or the Msg3 may be of multiple types of messages, thereby suitable to multiple application scenes; the indication information may be represented by at least one of a preamble or a time-frequency resource for sending the preamble, thereby saving the message length; the indication information may be at multiple locations in RRC signaling, thereby suitable to multiple application scenes; the base station may learn in advance whether the UE supports reporting indication information, allowing the base station to perform more targeted configuration; the base station may acquire the indication information timely, facilitating DC/CA configuration for the UE; and supporting a plurality of measurement targets and applicable to multiple application scenes.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited by the appended claims.

What is claimed is:

1. A method for transmitting measurement-related information, comprising:
generating, by a base station, a measurement configuration message, the measurement configuration message comprising a measurement target and threshold information; and
sending, by the base station, the measurement configuration message to a user equipment (UE),
wherein the measurement configuration message comprises a Radio Resource Control (RRC) connection release message or a system message,
wherein the threshold information comprises at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI,
wherein the measurement target comprises at least one of a measurement frequency or a cell,
wherein in response to the measurement target comprising a plurality of measurement targets, the threshold information comprises threshold information corresponding to the plurality of measurement targets, wherein the threshold information corresponding to the plurality of measurement targets is identical.

2. The method of claim 1, further comprising:
receiving a message Msg1 or Msg3 sent by the UE, the Msg1 or the Msg3 comprising indication information indicating whether a measurement result for a measurement target corresponding to the threshold information meets threshold information corresponding to the measurement target corresponding to the threshold information.

3. The method of claim 2,
wherein the indication information occupies 1 bit, and indicates whether each measurement result for the measurement target corresponding to the threshold information meets the threshold information corresponding to the measurement target corresponding to the threshold information; or
wherein a number of bits occupied by the indication information equals a number of the measurement target corresponding to the threshold information, wherein each bit of indication information indicates whether each measurement result for one measurement target corresponding to the threshold information meets threshold information corresponding to each measurement result.

4. The method of claim 2, wherein the Msg1 or the Msg3 comprises one of following messages: a random access request message, a Radio Resource Control (RRC) connection request message, an RRC connection resume request message, and an RRC connection reestablishment request message,
   wherein in response to determining that the Msg1 or the Msg3 is the random access request message, the indication information comprises at least one of a preamble or a time-frequency resource for sending the preamble,
   wherein in response to determining that the Msg1 or the Msg3 is the RRC connection request message, the RRC connection resume request message, or the RRC connection reestablishment request message, the indication information occupies a new field, an existing reserved field, or a reserved value of an existing field in the Msg1 or the Msg3.

5. The method of claim 2, further comprising at least one of following acts:
   receiving UE capability information reporting message sent by the UE, the UE capability information reporting message comprising UE capability information, the UE capability information indicating whether the UE supports carrying the indication information in the Msg1 or the Msg3, or
   sending at least one of a configuration message of dual connectivity (DC) or carrier aggregation (CA) to the UE, the configuration message comprising a Radio Resource Control (RRC) connection setup message, an RRC connection resume message, or an RRC connection reestablishment message.

6. A method for transmitting measurement-related information, comprising:
   receiving, by a user equipment (UE), a measurement configuration message sent by a base station, the measurement configuration message comprising a measurement target and threshold information;
   acquiring, by the UE, a measurement result corresponding to the measurement target;
   judging, by the UE, whether a measurement result for a measurement target corresponding to the threshold information meets threshold information corresponding to the measurement target corresponding to the threshold information, and determining, by the UE, indication information according to a result of the judgment; and
   sending, by the UE to the base station, the indication information,
   wherein the measurement configuration message comprises a Radio Resource Control (RRC) connection release message or a system message,
   wherein the threshold information comprises at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI,
   wherein the measurement target comprises at least one of a measurement frequency or a cell,
   wherein in response to the measurement target comprising a plurality of measurement targets, the threshold information comprises threshold information corresponding to the plurality of measurement targets, wherein the threshold information corresponding to the plurality of measurement targets is identical.

7. The method of claim 6,
   wherein the indication information occupies 1 bit, and indicates whether each measurement result for the measurement target corresponding to the threshold information meets the threshold information corresponding to the measurement target corresponding to the threshold information; or
   wherein a number of bits occupied by the indication information equals a number of the measurement target corresponding to the threshold information, wherein each bit of indication information indicates whether each measurement result for one measurement target corresponding to the threshold information meets threshold information corresponding to each measurement result.

8. The method of claim 6,
   wherein sending, by the UE to the base station, the indication information comprises: sending, by the UE, a message Msg1 or Msg3 to the base station, the Msg1 or the Msg3 comprising the indication information,
   wherein the Msg1 or the Msg3 comprises one of following messages: a random access request message, a Radio Resource Control (RRC) connection request message, an RRC connection resume request message, and an RRC connection reestablishment request message,
   wherein in response to determining that the Msg1 or the Msg3 is the random access request message, the indication information comprises at least one of a preamble or a time-frequency resource for sending the preamble,
   wherein in response to determining that the Msg1 or the Msg3 is the RRC connection request message, the RRC connection resume request message, or the RRC connection reestablishment request message, the indication information occupies a new field, an existing reserved field, or a reserved value of an existing field in the Msg1 or the Msg3.

9. The method of claim 6,
   wherein sending, by the UE to the base station, the indication information comprises: sending, by the UE, a message Msg1 or Msg3 to the base station, the Msg1 or the Msg3 comprising the indication information,
   wherein the method further comprises:
   sending UE capability information reporting message to the base station, the UE capability information reporting message comprising UE capability information, the UE capability information indicating whether the UE supports carrying the indication information in the Msg1 or the Msg3.

10. The method of claim 6, further comprising:
    receiving at least one of a configuration message of dual connectivity (DC) or carrier aggregation (CA) sent by the base station, the configuration message comprising one of following messages: a Radio Resource Control (RRC) connection setup message, an RRC connection resume message, or an RRC connection reestablishment message.

11. The method of claim 10, further comprising:
in response to reselecting a new cell or in response to leaving an original cell and failing to return to the original cell within a preset period of time, releasing the measurement target and the threshold information.

12. A device for transmitting measurement-related information, comprising:
a processor; and
a memory configured to store processor executable instructions,
wherein the processor is configured to implement:
receiving a measurement configuration message sent by a base station, the measurement configuration message comprising a measurement target and threshold information;
acquiring a measurement result corresponding to the measurement target;
judging whether a measurement result for a measurement target corresponding to the threshold information meets threshold information corresponding to the measurement target corresponding to the threshold information, and determining indication information according to a result of the judgment; and
sending the indication information to the base station,
wherein the measurement configuration message comprises a Radio Resource Control (RRC) connection release message or a system message,
wherein the threshold information comprises at least one of Reference Signal Receiving Power (RSRP) threshold information of a Synchronization Signal/Physical Broadcast Channel Block (SSB), Reference Signal Receiving Quality (RSRQ) threshold information of the SSB, Received Signal Strength Indication (RSSI) threshold information of the SSB, RSRP threshold information of Channel State Information (CSI), RSRQ threshold information of the CSI, or RSSI threshold information of the CSI,
wherein the measurement target comprises at least one of a measurement frequency or a cell,
wherein in response to the measurement target comprising a plurality of measurement targets, the threshold information comprises threshold information corresponding to the plurality of measurement targets, wherein the threshold information corresponding to the plurality of measurement targets is identical.

* * * * *